Patented Feb. 3, 1931

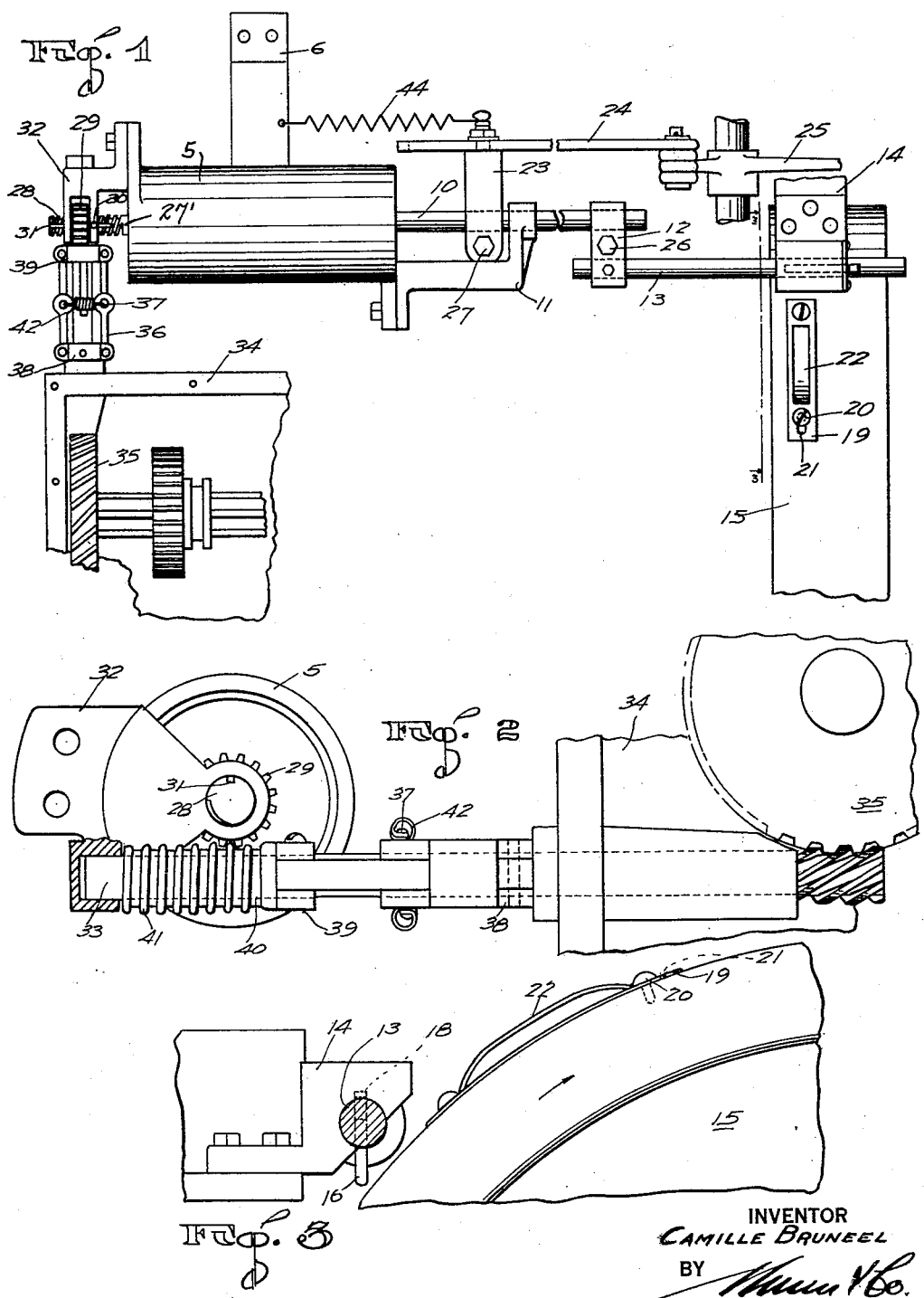

1,790,791

UNITED STATES PATENT OFFICE

CAMILLE BRUNEEL, OF SAN FRANCISCO, CALIFORNIA

AUTOMATIC CLUTCH CONTROL

Application filed January 18, 1927. Serial No. 161,901.

My invention relates to automatic controls for regulating the engagement of clutches for automobiles and the like so that the load required to be carried by the motor is increased or decreased in accordance with the speed of the motor thereby preventing too great a load to be imposed on the motor so as to cause stalling or choking thereof.

An object of the invention is to provide an apparatus of this character which is operatively attached to the drive shaft of the vehicle on the one hand and co-operably engageable with a part carried by the fly-wheel of the motor on the other hand and adapted to control the engagement of the clutch of the machine so as to accomplish such engagement in a more even and smoother manner.

A further object of the invention is to provide a device of this character which is adapted for installing on practically all motors employing the use of a clutch, without requiring any changes in the construction of the motor, which is efficient in operation and relatively inexpensive to manufacture.

Other objects and advantages reside in the combination, arrangement and construction of the various elements forming part of the invention as more fully hereinafter described and claimed in the following specification, reference being had to the accompanying drawings forming part hereof wherein like numerals refer to like parts throughout and in which Figure 1 is a plan view of my invention showing its relative position with respect to portions of a vehicle drive mechanism;

Figure 2 is a rear end view thereof;

Figure 3 is a sectional view taken substantially along a line 3—3 of Figure 1;

Figure 4:
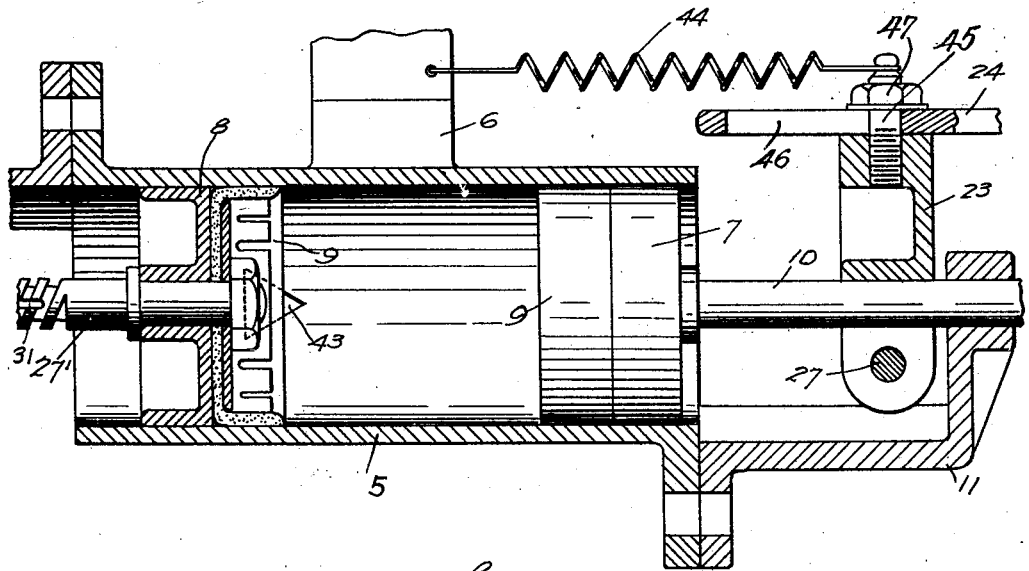
Figure 4 is a longitudinal sectional view through the cylinder.
Figure 5:
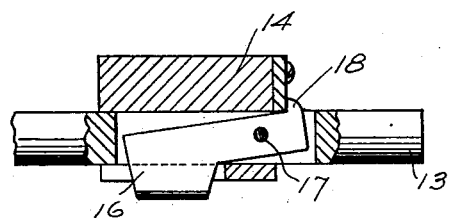
Figure 5 is a detail of the trip.

Referring now to the drawings wherein for the purpose of illustration I have disclosed a preferred embodiment of my invention I provide a cylinder 5 secured by a bracket 6 to some stationary part of the vehicle and within which is slidably arranged at opposite ends a pair of plungers 7 and 8. The plungers may be of any suitable type preferably provided with a flexible washer 9 to form an air-tight fit against the cylinder wall.

The plunger 7 is secured on the end of a shaft 10 which extends outwardly of the cylinder in a direction toward the motor and may be supported near its forward end by a bracket 11 through which the shaft is slidably fitted. Upon the forward end of the shaft is arranged a clamp 12 which is also secured on the rear end of a rod 13, the rod 13 being off-set from the shaft 10 and continuing forwardly thereof in parallel relation. The forward end of the rod 13 is slidably arranged within a bracket 14 secured to a stationary part of the engine frame adjacent the fly wheel 15 of the motor.

The rod 13 is provided with a trip 16 pivotally mounted on a pin 17 extending transversely through a slot formed in the rod, the trip being weighted at one end so as to cause such weighted end to normally drop downwardly, thus raising the opposite end which is provided with a lug 18 whereby to cause the same to engage the edge of the bracket 14 and thus prevent the rearward movement of the rod.

Upon the fly wheel 15 I arranged a plate 19 fixedly secured at one end and having its opposite end loosely secured by a screw 20 slidably arranged in a slot 21 provided in the plate. The plate is provided with a leaf spring 22 arranged to brush against the lower end of the trip as the fly wheel is rotated and the centrifugal force upon the spring by such rotation operates to raise the spring from the fly wheel and as the same engages the trip the lug 18 is released to permit the rod 13 to slide rearwardly as hereinafter explained.

Intermediate the ends of the shaft 10 is secured a clamp 23 to which is attached a link 24 in direct connection with the clutch pedal 25 of the vehicle. The clamps 12 and 23 are provided with adjusting nuts 26 and 27 respectively, so as to properly connect the various parts for efficient operation.

The plunger 8 is provided with a shaft 27' which extends outwardly from the rear end of the cylinder and the end of such shaft is formed into a threaded spindle 28. A spur gear 29 is mounted upon the threaded spindle and slidably arranged longitudinally thereof, the gear being internally threaded for engagement with the spindle. A vertical pin 30 carried by the front arm of a bracket 32 and disposed within a slot 31 formed in the spindle prevents the rotation of the shaft 27'. The bracket 32 is also provided with a transverse bore for receiving one end of a shaft 33 which extends through the transmission housing 34 and is rotatably engaged by a gear 35 carried on the drive shaft of the vehicle. A governor is arranged on the shaft 33 comprising arms 36 pivotally connected by pins 37 and having their ends pivotally attached to a pair of collars 38 and 39 arranged upon the shaft 33 in spaced relation. The collar 39 is slidably arranged thereon. A sleeve 40 is also slidably carried on the shaft and may be integrally formed with the collar 39 and upon said sleeve is provided a plurality of spaced apart ribs 41 constituting a rack which is arranged in engagement with the gear 29. A coil spring 42 connects the arms intermediate their ends so as to normally maintain the same in a position substantially parallel with the shaft.

It is obvious that as the drive shaft of the gear is rotated the shaft 33 will likewise be rotated and the centrifugal force thereof exerted upon the arms will spread the same apart so as to move the rack along the shaft and operate the plunger 8 through the gear 29 and the spindle 28.

An air port 43 is formed in the wall of the cylinder preferably of a triangular shape and in a position so that the plunger 8 normally partially closes the same.

The purpose of the plunger 8 and the governor 36 is to cause a quicker engagement of the clutch when the car is in motion than when stationary. That is, the governor will regulate the size of the opening 43 in direct ratio to the speed of the car. The amount of the opening 43, uncovered by the plunger 8, as shown in Figure 4, is sufficient for causing a slow movement of the plunger 9 and therefore a gradual throwing in of the clutch. This will cause the car to start away without jerking.

However, when the car is travelling at a high rate of speed and the clutch is disengaged, the governor operates to regulate the size of the opening 43. The latter, at the high rate of speed, becomes larger, and the clutch engages very quickly when the manual pressure is withdrawn from the clutch pedal.

In the operation of the apparatus with the vehicle in neutral position and with the motor running the drive shaft is of course out of engagement. The clutch pedal is pressed forward and the gear shift lever may be placed in a proper position to engage the driving gears desired, i. e., the low, intermediate or high. The pressing of the clutch pedal operates to move the plunger 7 outwardly of the cylinder thereby bringing the trip carried on the rod 13 in position above the spring 22. If the speed of the motor is sufficient no restraining action of the trip will occur and the rod 13 and the shaft 10 will be permitted to slide rearwardly to force the plunger within the cylinder as the clutch is let in. As the clutch becomes engaged momentum will be imparted to the drive shaft and to the shaft 33 and as the momentum increases the governor operates to withdraw the plunger 8 outwardly of the cylinder so as to permit the escapement of the air between the plungers in the cylinder which thereby draws the plunger 7 within the cylinder and permits the complete engagement of the clutch. The slow controlling movement of the plunger 7 will insure a smooth and slow engagement of the clutch thereby eliminating the jerky motions of the car which result from a too rapid letting in of the clutch.

With my invention it is practically impossible to stall the motor due to a too rapid engagement of the clutch as it will be impossible to release the trip which through its connections holds the clutch out of engagement until a sufficient motor speed is obtained.

A spring 44 may be connected to the clamp 23 and the bracket 6 to assist in maintaining the plunger 7 in engaged position. The clamp 23 also carries a pin 45 which is inserted in a slot 46 formed in the link 24 and the pin is provided with a tightening nut 47 so that the same may be adjusted properly with respect to the clutch pedal.

I claim:

1. The combination with a flywheel, a clutch pedal, and a drive shaft, of a cylinder having an exhaust opening therein, a piston mounted in the cylinder and operatively connected to the clutch pedal and being movable in the cylinder when the clutch pedal is depressed for effecting clutch release, a catch for temporarily holding the clutch pedal in depressed position, a trip control mounted on the flywheel for releasing the catch when the flywheel exceeds a predetermined speed, spring means for urging the piston and pedal in a direction for causing the engagement of the clutch, a second piston disposed in the cylinder and covering the greater portion of the exhaust opening, and governor-controlled means actuated by the drive shaft for causing the second-named piston to uncover the opening in direct ratio to the speed of the drive shaft.

2. The combination with a clutch pedal, a flywheel, and driven mechanism, of means for retarding the movement of the pedal into clutch engaged position, means for holding the pedal in clutch released position controlled by the rotating flywheel for releasing the pedal-holding means, and means controlled by the driven mechanism for controlling the retarding means.

CAMILLE BRUNEEL.